No. 777,618. PATENTED DEC. 13, 1904.
J. W. FARNOFF.
FASTENING FOR VEHICLE TIRES.
APPLICATION FILED JAN. 21, 1904.
NO MODEL.
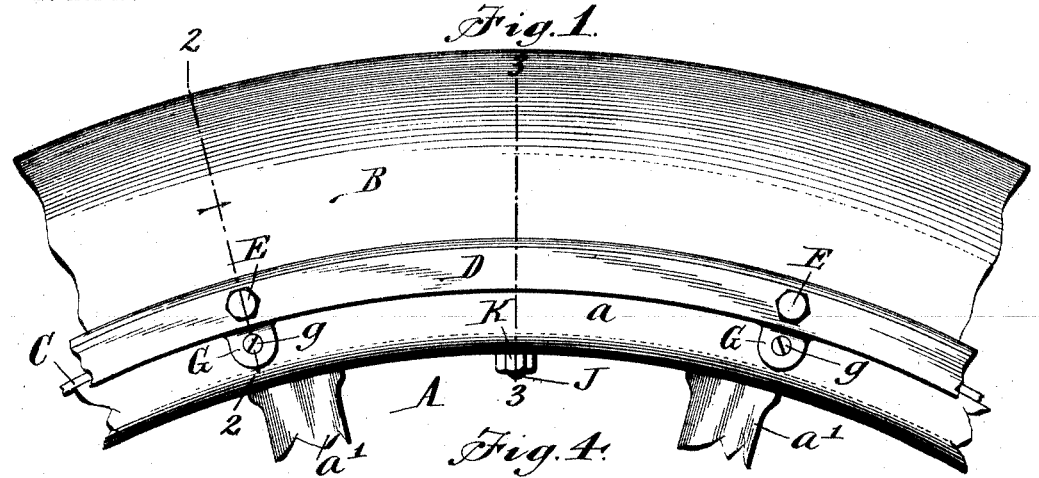
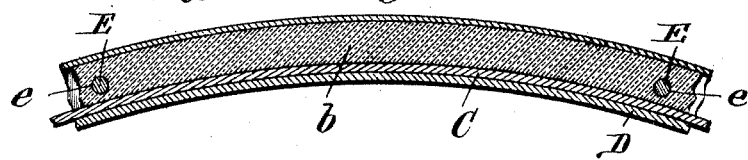
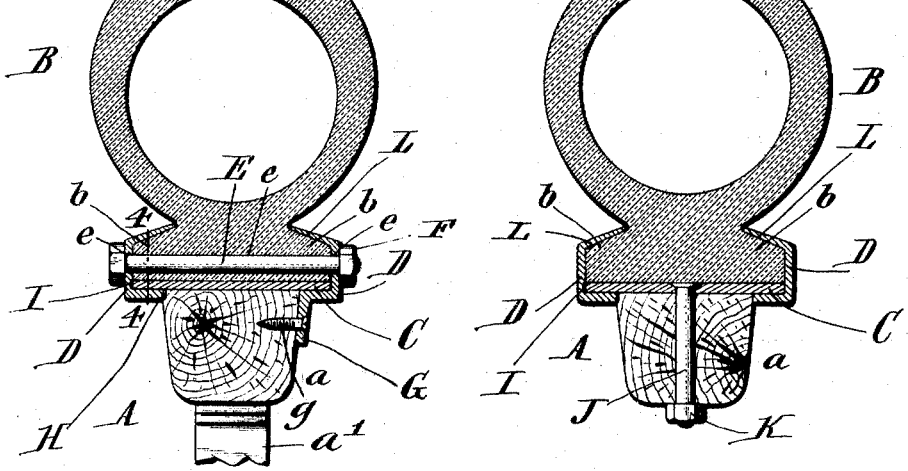
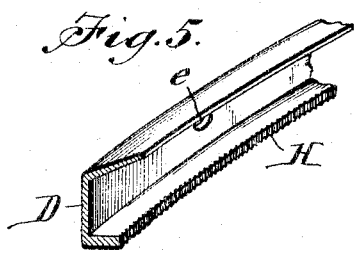
Jay W. Farnoff, Inventor.
Julius Lankes
Burt Mason } Witnesses.
By Keuhart & Burkhart
Attorneys.

No. 777,618. Patented December 13, 1904.

UNITED STATES PATENT OFFICE.

JAY W. FARNOFF, OF BUFFALO, NEW YORK, ASSIGNOR OF TWO-THIRDS TO HENRY KOONS, OF BUFFALO, NEW YORK; EDWARD L. KOONS AND MARY A. REIMAN EXECUTORS OF SAID HENRY KOONS, DECEASED.

FASTENING FOR VEHICLE-TIRES.

SPECIFICATION forming part of Letters Patent No. 777,618, dated December 13, 1904.

Application filed January 21, 1904. Serial No. 190,029. (No model.)

*To all whom it may concern:*

Be it known that I, JAY W. FARNOFF, a citizen of the United States, residing at Buffalo, in the county of Erie and State of New York, have invented certain new and useful Improvements in Fastenings for Vehicle-Tires, of which the following is a specification.

This invention relates to fastenings for vehicle-tires, and more particularly for double-tube inflatable tires or single-tube tires having their inner circumference provided with lateral extensions adapted to be engaged by said fastening.

The object of my invention is to provide a fastening of neat appearance which is simple, inexpensive, and effective in the performance of its functions and which will permit the tire to be quickly and conveniently removed from the wheel or attached thereto.

To this end the invention consists in the peculiar construction, arrangement, and combination of parts to be hereinafter described, and particularly pointed out in the subjoined claims.

In the drawings, Figure 1 is a side elevation of a portion of a vehicle-wheel, showing my invention applied thereto. Fig. 2 is an enlarged transverse section taken on line 2 2, Fig. 1. Fig. 3 is a similar section taken on line 3 3, Fig. 1. Fig. 4 is a longitudinal section taken on line 4 4, Fig. 2. Fig. 5 is a perspective view of a portion of the channeled locking-hoops. Fig. 6 is a side elevation of the metallic felly-band.

Referring to the drawings in detail, corresponding letters of reference refer to like parts in the several figures.

The reference-letter A designates the wheel, having a tire B secured thereto by means of my improved fastening device. The wheel has the usual felly $a$ and spokes $a'$, and secured to the outer periphery of said felly is a metallic band C, having its opposite longitudinal marginal portions extended beyond the sides of the felly. The tire used in connection with this device must be especially constructed when of the single-tube type, and in such cases two lateral extensions $b$ are formed on the inner periphery of the tire, so as to form a base corresponding in width with the metallic felly-band C.

Two annular channeled locking-hoops D are provided which when secured embrace the extensions $b$ of the tire and the extending longitudinal marginal portions of the felly-band C. Bolts E are passed through alined perforations $e$ in the extended base of the tire and the two channeled locking-hoops, and when the nuts F are applied to said bolts the latter hold the tire securely to the wheel. One of said locking-hoops is provided at intervals with depending ears G, which lie against the sides of the wood felly, and passing through perforations in said ears are fastening-screws $g$, that enter the felly and serve to hold said locking-hoop against movement on the wheel. The inner edge of the inner circumferential wall of the other locking-hoop is preferably serrated, as at H, so that when securely fastened by the bolts E the serrations become embedded in the felly. The adjacent edge of the felly-band C is also serrated, as at I, the teeth thereof serving to prevent slipping of the hoop when drawn against the said band by the bolts E. This arrangement effectually prevents creeping of the tire on the felly-band C. The latter may be secured to the felly in any approved manner, but, as shown in preferred form, has bolts J passing through the same and the felly and nuts K secured to the projecting inner ends of said bolts. The felly is by preference tapered inwardly to give the whole a finished appearance. The outer circumferential faces L of the tire extensions $b$ are inclined, and the corresponding walls of the locking-hoops are likewise inclined, thus serving to force the tire securely against the metallic band C when the hoops are drawn together.

It is to be understood that double-tube tires are well adapted for use in connection with this device, since all such tires are provided with lateral extensions whereby they are clenched to the wheel.

The removal of the tire from the wheel is exceedingly simple, it requiring only the withdrawal of the bolts and the removal of one locking-hoop, when the tire can be slid from the metallic band C with ease.

Having thus described my invention, what I claim is—

1. The combination of the wheel-felly, a metallic band secured to said felly and having its longitudinal marginal portions extending beyond the sides of said felly, a tire having lateral extensions, and channeled locking-hoops embracing said extensions and the said marginal portions of the metallic band.

2. The combination of the wheel-felly, a metallic band secured to said felly and having its longitudinal marginal portions extending beyond the sides of said felly, a tire having lateral extensions forming a circumferential base of like width to the said metallic band, channeled locking-hoops embracing said extensions and the said marginal portions of the metallic band, and bolts passing through the tire and the said hoops.

3. The combination of the wheel-felly, a metallic band secured to said felly and having its longitudinal marginal portions extending beyond the sides of said felly, a tire having lateral extensions provided with inclined outer circumferential faces, channeled locking-hoops having their outer circumferential walls inclined and being adapted to clench the tire to said metallic band, and means for locking the said hoops together.

4. The combination of the wheel-felly, a metallic band secured to said felly and having its longitudinal marginal portions extending beyond the sides of said felly, a tire bearing against said metallic band, a channeled locking-hoop secured to said felly and being arranged to receive a part of the tire and one of the extending marginal portions of the metallic band, a second channeled locking-hoop embracing another part of the tire and the opposite extending marginal portion of the metallic band, and bolts passing through the tire and the locking-hoops.

In testimony whereof I have affixed my signature in the presence of two subscribing witnesses.

JAY W. FARNOFF.

Witnesses:
 EMIL NEUHART,
 CHAS. F. BURKHART.